United States Patent [19]
Mason et al.

[11] Patent Number: 5,835,267
[45] Date of Patent: Nov. 10, 1998

[54] RADIOMETRIC CALIBRATION DEVICE AND METHOD

[75] Inventors: Kenneth L. Mason, Pittsford; Thomas W. Dey, Springwater, both of N.Y.

[73] Assignee: Eastman Kodak Company, Rochester, N.Y.

[21] Appl. No.: 893,943

[22] Filed: Jul. 15, 1997

[51] Int. Cl.$^6$ .................................................. G02B 23/00
[52] U.S. Cl. .................... 359/399; 359/853; 359/888; 359/889
[58] Field of Search .................................. 359/317, 318, 359/319, 300, 627, 629, 630, 631, 399, 853, 855, 888, 889

[56] References Cited

U.S. PATENT DOCUMENTS

| | | | |
|---|---|---|---|
| 3,922,085 | 11/1975 | Sheets | 359/888 |
| 3,957,354 | 5/1976 | Knop | 359/888 |
| 4,496,222 | 1/1985 | Shah | 359/300 |
| 4,623,245 | 11/1986 | Yu | 359/889 |
| 5,291,333 | 3/1994 | Mills et al. | 359/399 |
| 5,345,340 | 9/1994 | Goedert | 359/853 |
| 5,406,412 | 4/1995 | Zehnpfenning et al. | 359/399 |

*Primary Examiner*—Loha Ben
*Attorney, Agent, or Firm*—Thomas H. Close

[57] ABSTRACT

Apparatus and method for radiometrically calibrating an imaging sensor array using the sun as a calibration light source in an optical system of the type having an accessible real conjugate of the entrance pupil, includes a flux concentrator for concentrating the sunlight. A flux modulator modulates the intensity of the concentrated sunlight and a flux relay for relaying the intensity modulated sunlight to the real conjugate of the entrance pupil of the optical system. A flux diffuser located at the real conjugate of the entrance pupil of the optical system illuminates the imaging sensor array with diffuse intensity modulated sunlight for calibrating the imaging sensor. A radiometric calibration assembly is proposed to calibrate an imaging sensor array of an earth imaging system. The calibration assembly comprises a flux concentrator, a flux modulator, a flux relay lens and a flux diffuser located within a conjugate pupil of the earth imaging system. The flux concentrator transfers solar flux to the flux modulator, which modulates the flux to a number of controlled, deterministic levels. The flux relay lens transfers the modulated flux to the flux diffuser. The diffused flux illuminates the imaging sensor array, resulting in electrical signals that provide information to allow accurate calibration for use in imagery.

40 Claims, 3 Drawing Sheets

RADIOMETRIC CALIBRATION DEVICE AND METHOD

This invention was made with Government support under contract number F33657-90-C-6256 for the Department of Defense. The Government has certain rights in this invention.

FIELD OF THE INVENTION

This invention relates generally to the field of radiometry, and in particular to radiometric calibration of photodetectors in space employing the sun as a deterministic source of radiation.

BACKGROUND OF THE INVENTION

Planetary imagers, especially orbital earth imagers, are useful for remote sensing of atmospheric composition, geologic morphology and chemistry, crop assessment, weather prediction, and monitoring the activities of man. Monochromatic and multispectral satellite based imagers can quantify properties of the above earth characteristics, provided their solid state detector arrays are properly calibrated in relation to radiometric responsivities.

One prior art method of employing the sun for calibration of an image sensor is to place a diffuser over the entrance pupil of the imaging system and allow the diffuser to be illuminated by direct sunlight. This arrangement is practical only for relatively small optical systems since the diffuser must exceed the size of the entrance pupil to provide sufficient flux for calibration of the sensor. For larger optical systems, this becomes impractical due to the relatively large size of the diffuser. A prior art method of sensor calibration employing the sun as a specular calibration light source is schematically illustrated in FIG. 2. This method uses a radiometric calibration assembly 10, shown located within an earth imaging system 12, comprising primary mirror 14 and secondary mirror 16. Calibration assembly 10 comprises an entrance port 18, a flat fold mirror 20, a lens 22, and a perforated plate 24. The perforated plate 24 is shown in detail in FIG. 3. A plurality of small apertures 26, 28, 30, 32 are formed in the otherwise opaque plate 24. Each aperture is of a different size, but each is necessarily smaller than the image 34 of the sun 36 formed by lens 22 (see FIG. 2). In execution of the radiometric calibration, the sun's image is caused to move to, and park upon each aperture in turn. For example, the fold mirror 20 can be steered to place a solar image 34 (see FIG. 3) upon smallest aperture 26, resulting in a discrete lowest calibration flux level being delivered to an imaging sensor array 38. The array responsivity to this flux level is measured and then fold mirror 20 can be steered to place the solar image 34 upon the next larger aperture 28, resulting in a discrete higher calibration flux level. The array responsivity to a sequence of discrete and increasing flux levels, representative of the range of anticipated imaging flux levels is thus achieved.

This prior art calibration method retains a number of detractors. It requires very accurate pointing of the calibration device toward the sun, so that the solar image centers upon each of the circular apertures. A pointing accuracy requirement of 18 arc seconds, representing 1% of the diameter of the solar disc is typical. Even more stringent requirements are common, depending on the required calibration accuracy. A second detractor is that in order to match the flux passing through the apertures to the desired levels, a relatively large optical pupil of the earth imaging system must be accessed. This optical pupil is typically the primary mirror 14 of the earth imaging system 12, or the image of the primary mirror formed by the secondary mirror 16. In the first case, the pupil is partially obstructed, blocking light from entering the imager which would otherwise be available for imaging. In the second case, the calibration assembly is located in the vicinity of the secondary mirror, adding undesirable moment of inertia to the earth imaging system 12, and thus compromising its agility to point at targets of interest. A third detractor is that the two described locations of traditional calibration devices are forward of the primary mirror 14 of the earth imaging system 12. This subjects the calibration optics to the harsh environment of outer space experienced by orbiting imaging satellites. A fourth detractor is that the specular calibration optics result in undesirable non-uniformities in the calibration flux distribution at the imaging sensor array 38, due to the extremely high focal ratio needed to match direct solar flux levels to in-use imaging flux levels, causing even the smallest dust motes or blemishes on optical surfaces to project starkly onto the detector. This non-uniformity artifact is commonly referred to as "ripple". A fifth detractor is the relatively heavy weight of prior art calibration optical assemblies.

There is a need therefore for an improved method and apparatus for sunlight calibration of an image sensor in an orbital planetary imaging system.

SUMMARY OF THE INVENTION

The present invention is directed to overcoming one or more of the problems set forth above. Briefly summarized, according to one aspect of the present invention, apparatus and method for radiometrically calibrating an imaging sensor array using the sun as a calibration light source in an optical system of the type having an accessible real conjugate of the entrance pupil, includes a flux concentrator for concentrating the sunlight. A flux modulator modulates the intensity of the concentrated sunlight and flux relay optics direct the intensity modulated sunlight to the real conjugate of the entrance pupil of the optical system. A flux diffuser located at the real conjugate of the entrance pupil of the optical system illuminates the imaging sensor array with diffuse intensity modulated sunlight for calibrating the imaging sensor.

In a preferred embodiment, the flux concentrator is non-imaging. The nature of the non-imaging concentrator allows dramatic relaxation of the required pointing accuracy toward the sun. The only requirement is that the flux entering the concentrator entrance port is efficiently piped to its exit port. A typical pointing accuracy requirement is 3 arc-minutes. Regarding pupil obscuration and moment of inertia, in the most typical case, where the earth imaging system comprises primary and secondary mirrors, the conjugate pupil location will have a non-illuminated "dead zone" at its center, due to the shadow of the secondary mirror cast upon the pupil. The optical diffuser used for calibration is positioned within this "dead zone", thus preventing any added obscuration of the available light for imaging. Moreover, this conjugate pupil is most typically located behind the primary mirror, thus minimizing the moment of inertia added to the earth imaging system by the radiometric calibration assembly. The harsh environment of outer space is shielded from the radiometric calibration assembly because it is located behind the primary mirror and within the earth imaging system shroud. A significant advantage of the new radiometric calibration assembly is its desensitization to "ripple" effects. This is because the optical diffuser feeds the imaging detector at a relatively low focal ratio, and also evades all but the final elements of the imaging optics, substantially reducing the signatures of dust, and blemishes. The weight of the proposed radiometric calibration assembly can be relatively low because the non-imaging solar flux concentrator is small and may be hollow, the relay lens is small and the diffuser is very small compared with prior art specular calibration assemblies.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
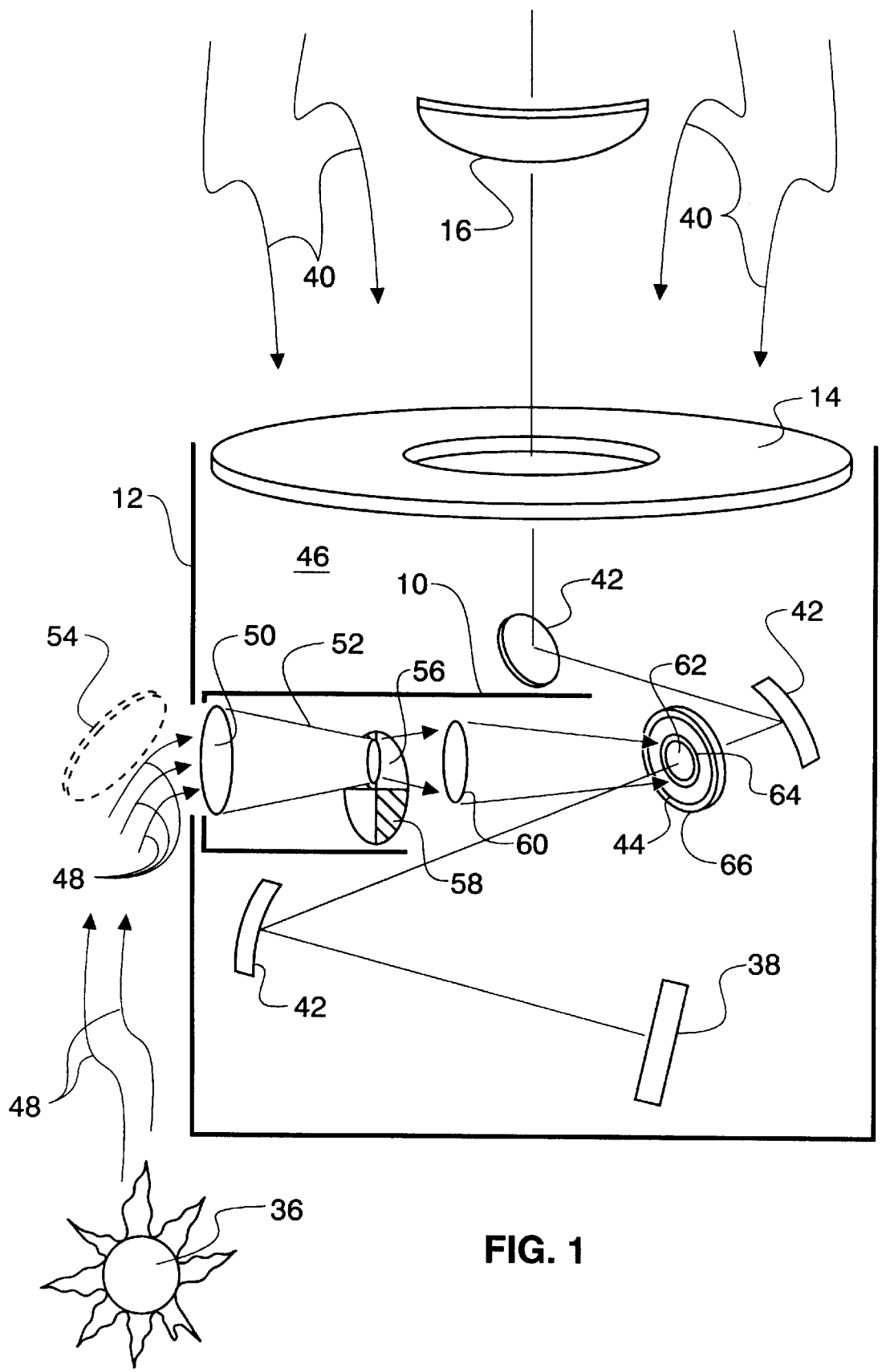
FIG. 1 is a schematic diagram of an earth imaging system employing a radiometric calibration assembly according to the present invention.
Figure 2:
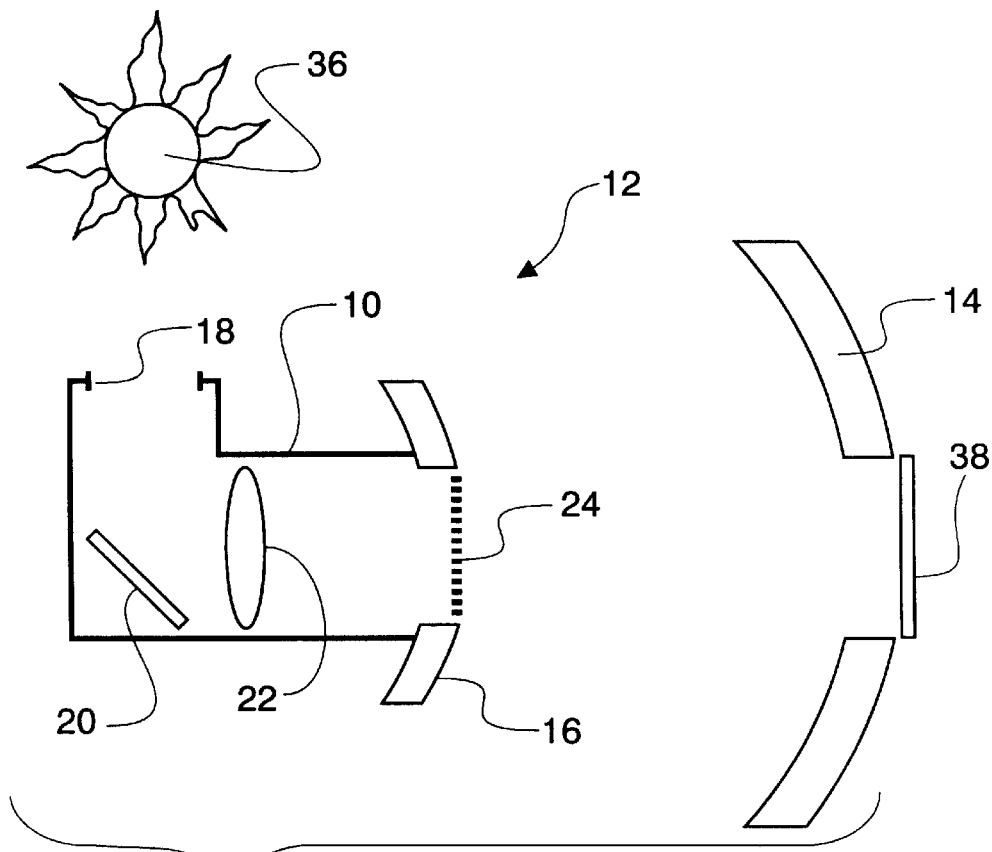
FIG. 2 is a schematic representation of an earth imaging system employing a prior art device for radiometric calibration using a plate comprising a plurality of perforations.
Figure 3:
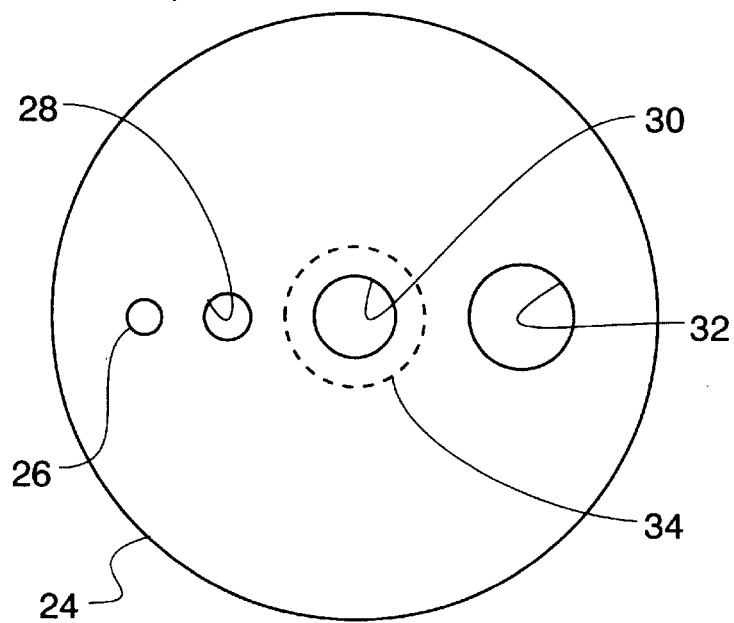
FIG. 3 is a schematic representation showing a face-on view of the perforated plate employed in the device of FIG. 2, comprising a plurality of perforations.

The entirety of the present invention can be understood with reference to FIG. 1. A typical earth imaging system 12 is located above the surface of the earth and pointed generally earthward, to collect information. Light from earth, indicated by lines 40, enters the imaging system 12 and is reflected from primary mirror 14 to secondary mirror 16 and ultimately forms an image on imaging sensor array 38 via additional relay optics 42 within the imaging system 12. Relay optics 42 are configured to provide an accessible conjugate entrance pupil 44. The imaging sensor array 38 converts the image into electrical signals that can be broadcast to earth and evaluated. This is the common mode of operation of modem earth imaging systems, including those born by aircraft and satellites.

In order to aid in the quantification of information for scientific purposes and accurate correspondence of image to object, it is necessary to accurately calibrate the imaging sensor array 38. The calibration involves determining the response of each part of the array to various accurately-known light flux levels. With this knowledge, the information generated by images of the earth can be quantitatively related to the scene being evaluated.

To this end, a radiometric calibration assembly 10 according to the present invention is incorporated into the interior 46 of the earth imaging system 12. The use of the calibration assembly 10 can most easily be described by reference to the calibration flux from the sun 36, as it enters the calibration assembly 10 and is ultimately delivered to the imaging sensor array 38.

Light 40 from earth is first prevented from entering the earth imaging system 12. This is accomplished by blocking the entrance with a shutter or door, or, in the case of an earth orbiting satellite, pointing the system away from the earth toward the darkness of deep space. Solar calibration flux 48, emanating from the direction of the sun 36, is allowed to enter an entrance port 50 of non-imaging solar flux concentrator 52. This is accomplished by either orienting the earth imaging system 12 bodily to point the entrance port generally toward the sun, or equivalently diverting the solar flux into the entrance port 50 with an auxiliary flat fold mirror 54 shown in phantom in FIG. 1. Solar flux concentrator 52 is preferably a tapered light pipe constructed from quartz or clear plastic. Alternatively the flux concentrator may by a hollow light pipe having internal reflective surface to save weight. A concentrating light pipe is a non-imaging optical element that trades off angular dispersion of the light for flux concentration. Alternatively, a specular, imaging flux concentrator, such as a Galilean telescope may be employed.

The solar flux is transported from the exterior to the interior 46 of the earth imaging system 12 by passing along the length of the non-imaging solar flux concentrator 52 and emerging from an exit port 56. The flux level is amplified by a factor determined by the relative areas of the entrance and exit ports 50 and 56, respectively. The amount of flux needed at the exit port is determined by the illumination needed at the imaging sensor 38 to match the highest intensity expected during normal imaging.

The flux then encounters spatial flux modulator 58. Many types of spatial flux modulators are available and well known. One preferred type comprises clear and opaque regions on a rotatable quartz substrate. As the substrate is indexed into position by a motor or solenoid (not shown), the edge of the opaque region blocks a portion of the flux, thus controlling the amount of flux passed. A second type of flux modulator comprises a graded neutral density optical transmission filter on a rotatable quartz substrate. In this case, rotation of the substrate causes regions of greater attenuation to encounter the flux, controlling the amount passed. In this way, the flux is adjusted in a deterministic fashion covering the full range from the minimum to the maximum desired calibration levels. The flux next encounters relay lens 60, which images the exit port 56 upon an optical diffuser 62. The lens focal length, diameter and location are selected to assure that the spot of illumination defined by the flux is sharply defined, uniform and smaller than the diameter of diffuser 62. The material of diffuser 62 is selected to reflect the calibration flux efficiently for all spectral wavelengths used in imagery. A good choice of material is silicon dioxide powder in a clear adhesive carrier, such as Kodak white reflectance coating, most commonly used to coat the interiors of optical integrating spheres. The diffuser 62 is preferably applied to a clear quartz substrate 66, positioned at a conjugate pupil 44 of earth imaging system 12. This pupil 44 is most commonly identified as the image of the primary mirror 14, formed by the secondary mirror 16 and other down-stream imaging optical elements 42. These additional elements 42 may be mirrors, which place a sharp image of the scene upon the imaging sensor array 38. A consequence of their use is the existence of accessible conjugate pupil 44.

We take advantage of the conjugate pupil 44 for two reasons. The first reason is that the imaging light appears to come from the pupil. It is therefore the ideal location for the optical diffuser 62, which should reflect the calibration flux from the same position and direction as the imaging light. The second reason is that there naturally exists a partially obstructed region 64, which is the shadow of the secondary mirror 16 projected into the pupil by the imaging system optical elements. This is pertinent, because it provides a region of the pupil from which no imaging light emanates.

This region is therefore freely available for our optical diffuser 62, without resulting in any blockage of imaging light by the diffuser 62. Therefore we have the diffuser 62 ideally located for its intended function, without in any way detracting from the full available illumination and resolution of the imaging optics. Finally, the calibration flux is reflected from the diffuser 62 and falls on the imaging sensor array 38. The deterministic solar calibration flux is thus provided to effect an accurate calibration of the array 38.

In executing an actual calibration, spatial flux modulator 58 is indexed to a multiplicity of positions, causing a corresponding deterministic sequence of calibration flux levels to excite the array 38. The electrical signals from the array are either collected and analyzed by an on-board computer to effect calibration of the array, or alternatively down-linked via radio signals to the ground for calibration analysis. In this way, differences in responsivity bias and gain can be corrected, to allow the array to perform in a more ideal sense when imaging. This will cause hard copy images of the ground scene to be free of blemishes and other irregularities that would otherwise contaminate the raw images. Furthermore, quantitative evaluation of the image information for scientific purposes will have greater integrity, accuracy and utility.

Figure 4:
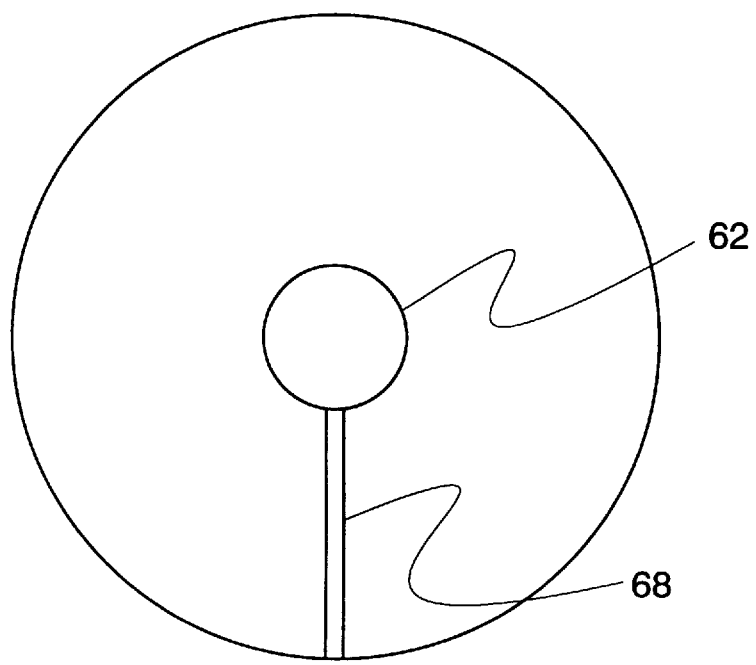
FIG. 4 is a schematic diagram showing an alternative method of mounting the diffuser employed in FIG. 1.
Figure 5:
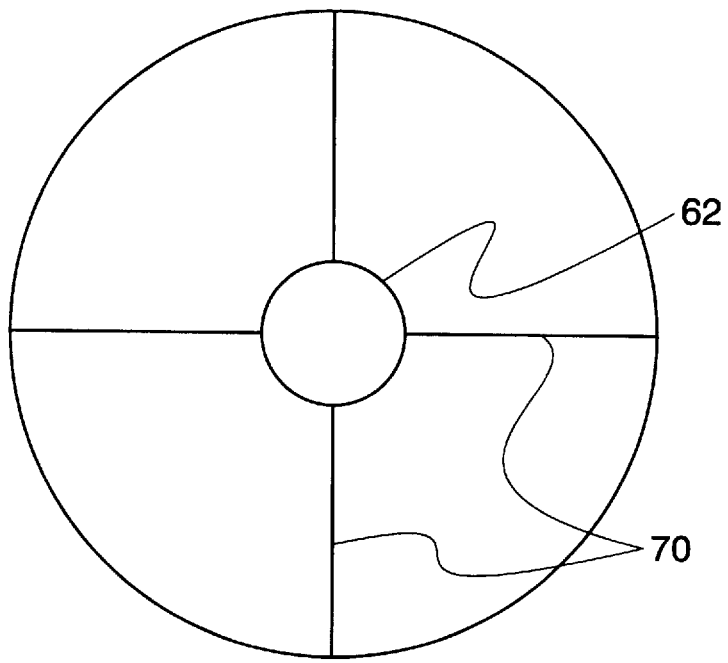
FIG. 5 is a schematic diagram showing a further alternative method of mounting the diffuser employed in FIG. 1.

It is to be appreciated that a preferred embodiment has been described in detail. Obvious variations on this theme include the following. The earth imaging system 12 can take on a variety of forms other than that described. It may be populated with lenses rather than mirrors. Lenses are more typical of imagers of smaller sizes up to 10 cm clear aperture. Mirrors are more typical of imagers of larger sizes ranging from 10 cm to many meters. We have described remote calibration using the sun as a source. This is most typically a need when calibrating unmanned imagers such as those resident on satellites and drones. Other imaging systems can also use the described calibration hardware and methodology. For example, lunar based astronomical observatories and earth imagers would greatly benefit. Planetary imaging satellites would also benefit, as well as earth-orbiting astronomical observatories. The non-imaging solar flux concentrator 52 was described as preferred for solar flux collection and transfer from the outside to the inside of the earth imaging system 12. An alternative collection device could be a combination of mirrors or lenses, providing a periscope transport of solar flux. Two types of spatial light modulators 58 were described. Many others are well known in the art, including liquid crystal modulators, electrically excited dye cells and moire convolution screens. Relay lens 60 could alternatively be in the form of a concave mirror. The optical diffuser 62 is described as reflective. It could alternatively be a transmissive diffuser, such as fire-flashed opal glass. The supporting structure for the diffuser is described as a clear quartz substrate 66. Other materials such as glass may be used. Alternatively, a rod 68 as shown in FIG. 4, or wires 70 as shown in FIG. 5 could be used to support a small disc comprising the diffuser 62.

It will be appreciated that further variations and modifications to the described preferred embodiment and alternatives can be effected by a person of ordinary skill in the art without departing from the scope of the invention.

PARTS LIST 10 radiometric calibration assembly
12 earth imaging system
14 primary mirror
16 secondary mirror
18 entrance port
20 flat fold mirror
22 lens
24 perforated plate
26 aperture
28 aperture
30 aperture
32 aperture
34 image of sun
36 sun
38 imaging sensor array
40 light from earth
42 relay optics
44 accessible conjugate of entrance pupil
46 interior of earth imaging system
48 solar calibration flux
50 entrance port
52 non-imaging solar flux concentrator
54 flat fold mirror
56 exit port
58 spatial flux modulator
60 relay lens
62 optical diffuser
64 partially obstructed region
66 clear quartz substrate
68 rod
70 wires

We claim:

1. Apparatus for radiometrically calibrating an imaging sensor array using the sun as a calibration light source in an optical system of the type having an accessible real conjugate of an entrance pupil, comprising:
    a) a flux concentrator for concentrating sunlight;
    b) a flux modulator for modulating the intensity of the concentrated sunlight;
    c) a flux relay for relaying the intensity modulated sunlight to the real conjugate of the entrance pupil of the optical system; and
    d) a flux diffuser located at the real conjugate of the entrance pupil of the optical system for illuminating the imaging sensor array with diffuse intensity modulated sunlight.

2. The apparatus claimed in claim 1, wherein the flux concentrator is a non-imaging optical element.

3. The apparatus claimed in claim 2, wherein the flux concentrator is a tapered light bar having an entrance port and taper of a size sufficient in cooperation with the flux relay and the diffuser to provide a flux intensity on an image sensor of the array that substantially matches the maximum flux levels expected at the image sensor from the scene to be imaged.

4. The apparatus claimed in claim 1, wherein the flux modulator comprises a plate with clear and opaque regions.

5. The apparatus claimed in claim 4, wherein the plate with clear and opaque regions is made of quartz.

6. The apparatus claimed in claim 1, wherein the flux modulator comprises a plate with neutral attenuating regions.

7. The apparatus claimed in claim 6, wherein the plate with neutral attenuating regions is made of quartz.

8. The apparatus claimed in claim 1, wherein the flux relay is a lens.

9. The apparatus claimed in claim 1, wherein the flux relay is a concave mirror.

10. The apparatus claimed in claim 1, wherein the flux diffuser is reflective.

11. The apparatus claimed in claim 1, wherein the flux diffuser is transmissive.

12. The apparatus claimed in claim 1, wherein the flux diffuser is supported by a clear substrate.

13. The apparatus claimed in claim 12, wherein the clear substrate is made of quartz.

14. The apparatus claimed in claim 1, wherein the flux diffuser is supported by a rod.

15. The apparatus claimed in claim 1, wherein the flux diffuser is supported by wires.

16. The apparatus claimed in claim 1, wherein the pupil of the optical system is partially obstructed and the flux diffuser is located within the partially obstructed region of the pupil of the optical system.

17. The apparatus claimed in claim 16, wherein the flux diffuser is located at the center of the pupil of the optical system.

18. The apparatus claimed in claim 1, wherein the flux diffuser is located at the center of the pupil of the optical system.

19. The apparatus claimed in claim 1, wherein the flux concentrator is an imaging optical assembly configured to cooperate with the flux relay and the diffuser to provide a flux intensity on an image sensor of the array that substantially matches the maximum flux levels expected at the image sensor from the scene to be imaged.

20. The apparatus claimed in claim 1, wherein the optical system includes a primary mirror and the pupil of the optical system is an image of the primary mirror.

21. A method for radiometrically calibrating an imaging sensor array using the sun as a calibration light source in an optical system of the type having an accessible real conjugate of an entrance pupil, comprising the steps of:

a) concentrating sunlight with a solar flux concentrator;

b) modulating the intensity of the concentrated sunlight with a flux modulator;

c) relaying the intensity modulated sunlight with a flux relay to the real conjugate of the entrance pupil of the optical system;

d) diffusing the concentrated, modulated sunlight with a flux diffuser at the real conjugate of the entrance pupil of the optical system; and e) illuminating the imaging sensor array with the diffuse intensity modulated sunlight.

22. The method claimed in claim 21, wherein the flux concentrator is a non-imaging optical element.

23. The method claimed in claim 22, wherein the flux concentrator is a tapered light bar having an entrance port and taper of a size sufficient in cooperation with the flux relay and the diffuser to provide a flux intensity on an image sensor of the array that substantially matches the maximum flux levels expected at the image sensor from the scene to be imaged.

24. The method claimed in claim 21, wherein the flux modulator comprises a plate with clear and opaque regions.

25. The method claimed in claim 24, wherein the plate with clear and opaque regions is made of quartz.

26. The method claimed in claim 21, wherein the flux modulator comprises a plate with neutral attenuating regions.

27. The method claimed in claim 26, wherein the plate with neutral attenuating regions is made of quartz.

28. The method claimed in claim 21, wherein the flux relay is a lens.

29. The method claimed in claim 21, wherein the flux relay is a concave mirror.

30. The method claimed in claim 21, wherein the flux diffuser is reflective.

31. The method claimed in claim 21, wherein the flux diffuser is transmissive.

32. The method claimed in claim 21, wherein the flux diffuser is supported by a clear substrate.

33. The method claimed in claim 32, wherein the clear substrate is made of quartz.

34. The method claimed in claim 21, wherein the flux diffuser is supported by a rod.

35. The method claimed in claim 21, wherein the flux diffuser is supported by wires.

36. The method claimed in claim 21, wherein the pupil of the imaging system is partially obstructed and the flux diffuser is located within the partially obstructed region of the conjugate pupil of the imaging system.

37. The method claimed in claim 36, wherein the flux diffuser is located at the center of the pupil of the optical system.

38. The method claimed in claim 21, wherein the flux diffuser is located at the center of the conjugate pupil of the imaging system.

39. The method claimed in claim 21, wherein the flux concentrator is an imaging optical assembly configured to cooperate with the flux relay and the diffuser to provide a flux intensity on the image sensor that substantially matches the maximum flux levels expected at the image sensor from the scene to be imaged.

40. The method claimed in claim 21, wherein the optical system includes a primary mirror and the pupil of the optical system is an image of the primary mirror.

\* \* \* \* \*